United States Patent [19]
Lee et al.

[11] Patent Number: 5,377,029
[45] Date of Patent: Dec. 27, 1994

[54] PLASMA ADDRESSED LIQUID CRYSTAL DISPLAY

[75] Inventors: Seung-Woo Lee; Ki-Duck Kwon, both of Seoul, Rep. of Korea

[73] Assignee: Samsung Electron Devices Co., Ltd., Kyungki, Rep. of Korea

[21] Appl. No.: 958,146

[22] Filed: Oct. 8, 1992

[30] Foreign Application Priority Data

Oct. 16, 1991 [KR] Rep. of Korea .................. 91-18231

[51] Int. Cl.⁵ .......................................... G02F 1/1343
[52] U.S. Cl. .......................................... 359/54; 359/87; 345/37
[58] Field of Search ............................ 359/54, 55, 87; 340/771, 794, 781, 784

[56] References Cited

U.S. PATENT DOCUMENTS

| | | | |
|---|---|---|---|
| 3,845,241 | 10/1974 | Schwartz | 340/781 |
| 4,896,149 | 1/1990 | Buzak et al. | 340/794 |
| 5,221,979 | 6/1993 | Kim | 359/54 |

*Primary Examiner*—William L. Sikes
*Assistant Examiner*—Huy Mai
*Attorney, Agent, or Firm*—Leydig, Voit & Mayer

[57] ABSTRACT

A plasma addressed liquid crystal display is disclosed whose addressing unit comprises barriers of a predetermined height formed between planar second and third substrates, a single or divided first electrode positioned on the inner face of the third substrate, and second electrodes parallel to the barriers, thereby facilitating manufacturing and allowing for a large screen display.

10 Claims, 3 Drawing Sheets

PLASMA ADDRESSED LIQUID CRYSTAL DISPLAY

BACKGROUND OF THE INVENTION

The present invention relates to a plasma addressed liquid crystal display. Common displays include a phosphor display tube using a low-speed electron beam, a plasma display using gas discharge, an electro-luminescence (EL) display using the electro-luminescence effect, an electro-optical liquid crystal display (LCD), as well as a traditional cathode ray tube using a high-speed electron beam. The various displays are selectively adapted according to their characteristics since they have different functions and structures. Their common purpose is to visualize an electrical image signal or a data signal.

Recently, a matrix-type display compositely constructed with the plasma discharge device and electro-optical device, which is one type of LCD, was disclosed in U.S. Pat. No. 4,896,149 by Tektronix. This display addresses lines by linear plasma discharge which is shown in FIG. 1. Referring more particularly to FIG. 1, the display is constructed such that a liquid crystal shutter 10 in which a plurality of striped data electrodes 14 are arranged in parallel, overlaps a plasma addressing unit 20 in which a plurality of unit scan lines 21 are arranged at right angles to striped data electrodes 14 of liquid crystal shutter 10.

With reference to FIG. 2, liquid crystal shutter 10 has first and second transparent substrates 12 and 13 between which liquid crystal 16 is filled. Striped data electrodes 14 are formed on the inner side of the first substrate 12. Addressing unit 20 has a plurality of grooves 24 which form scan lines 21 on a third substrate 25 at right angles to the striped pixels. A pair of electrodes 22 and 23 are provided on either side of the bottom of each groove 24. In this configuration, third substrate 25 is adhesively fixed to bottom substrate 13 of liquid crystal shutter 10 so that grooves 24 form a closed discharge space in which discharge gas is filled.

In liquid crystal shutter 10, since a data signal is applied to a selected data electrode 14, a potential for activating the liquid crystal is formed along a selected data electrode 14. In plasma addressing u31it 20, according to the ionized state of each discharge line due to the plasma discharge of each sequentially-selected plasma scanning line 21, a positive potential for activating the liquid crystal 16 is formed linearly along scanning line 21 on second substrate 13 in contact with the liquid crystal. Accordingly, a potential difference is formed by a selected data electrode 14 of liquid crystal shutter 10 and scanning line 21 of plasma addressing unit 20. Liquid crystal positioned at the intersection is activated and oriented by the potential difference at the interconnection, which forms a light passing area through which light from the rear ward back light generator passes.

In other words, in plasma addressing unit 20, when voltage of a predetermined potential is applied to a pair of parallel electrodes 22 and 23 on a sequentially selected scanning line, linear direct-current-discharge occurs between parallel electrodes 2 and 23. Due to this, a linear ionization region is formed along scanning line 21 on the thinner second substrate 13. When the linear ionization region is formed on second substrate 13 by the linear discharge on scanning line 21 selected by the scanning signal, a data signal is selectively applied to data electrode 14 of the upper liquid crystal shutter 10. When liquid crystal is then activated by the potential difference at the intersection of the selected data electrode 14 and the selected and discharged scanning line 21 and is locally re-arranged, back light passes, forming one picture point.

The above display is a unique flat-panel display in which the liquid crystal orientates itself by means of the pixel electrodes and discharge lines. Its drawback is that as described above, since the addressing unit requires, as its structural base, grooves 24 formed on third substrate 25 and a pair of electrodes 22 and 23 formed on the bottom thereof, the manufacture of the display is very elaborate. In other words, to form groove 24 on third substrate 25, a complicated etching process is required. Especially, forming a pair of electrodes on the bottom of the groove requires more than a simple silk screen printing method, i.e., a photolithography method including a metal deposition. Such a technique for forming a groove on glass and forming an electrode thereon is very complicated, especially for a large-screen display.

SUMMARY OF THE INVENTION

Therefore, it is an object of the present invention to provide a plasma addressed liquid crystal display which facilitates manufacture of a large display.

To accomplish this and other objects, the plasma addressed liquid crystal display comprises first and second substrates filled with liquid crystal therebetween, a plurality of striped data electrodes formed on the inner side of the first substrate, a third substrate opposing the outer side of the second substrate, a plurality of barriers of a predetermined height disposed between the second and third substrate at right angles to the data electrodes, a single or divided first electrode formed over the whole surface of the third substrate, and a plurality of second electrodes disposed in parallel with the barriers on the top of the first electrodes exposed between the barriers, while electrically insulated from the first electrodes.

In one embodiment of the LCD of the present invention the second electrodes are formed on the first electrodes by interposing striped insulators on the top of the first electrodes. In another embodiment, the second electrodes face the first electrode and are formed on the second substrate. The structure wherein the second electrodes are formed on the first electrode is advantageous in the switching efficiency of the liquid crystal, and the structure wherein the second electrodes are formed on the second substrate is advantageous in discharge efficiency. The first electrode may be formed in one piece which corresponds to all the second electrodes.

As the material of the present invention, the first and second electrodes are desirably formed of metal paste which allows screen printing. It is desirable that the second electrodes be formed with a transparent conductive thin layer.

BRIEF DESCRIPTION OF THE DRAWINGS

The above object and other advantages of the present invention will become more apparent by describing in detail a preferred embodiment of the present invention with reference to the attached drawings in which.

DETAILED DESCRIPTION OFT HE INVENTION

Figure 1:
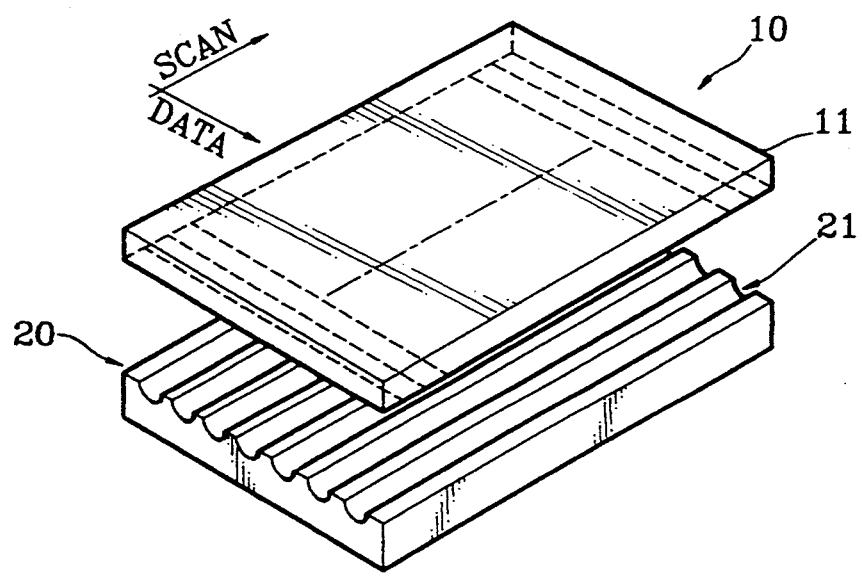
FIG. 1 is a schematic exploded perspective of a conventional plasma addressed liquid crystal display.
Figure 2:
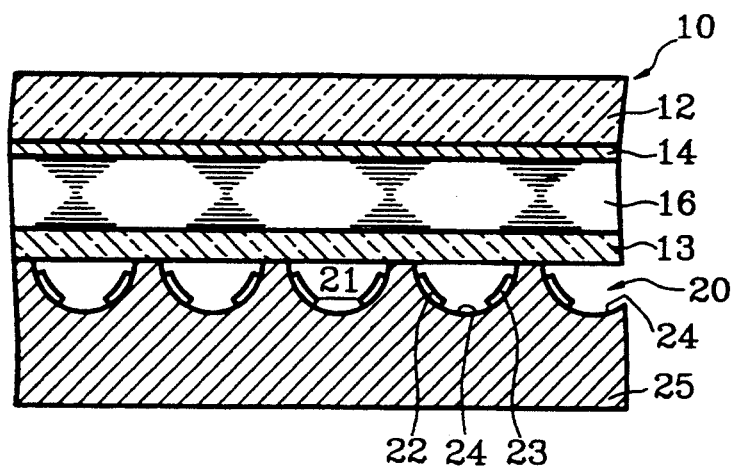
FIG. 2 is a partially-enlarged extracted sectional view of the display shown in FIG. 1.
Figure 3:
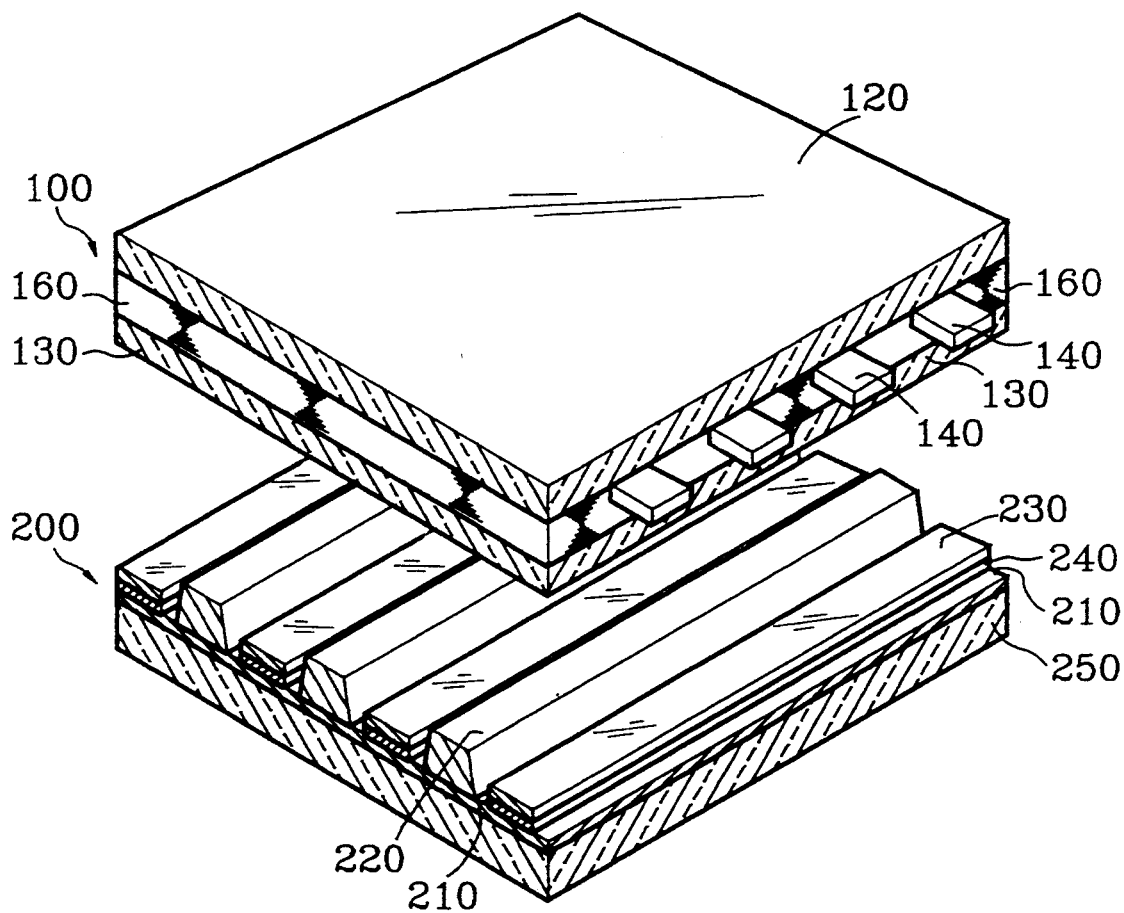
FIG. 3 is a schematic exploded perspective of a plasma addressed liquid crystal display of the present invention.

Referring to FIG. 3, the liquid crystal display of the present invention is divided into a liquid crystal shutter 100 and a plasma addressing unit 200 at the rear of which a background light generator (not shown) is placed.

Figure 4:
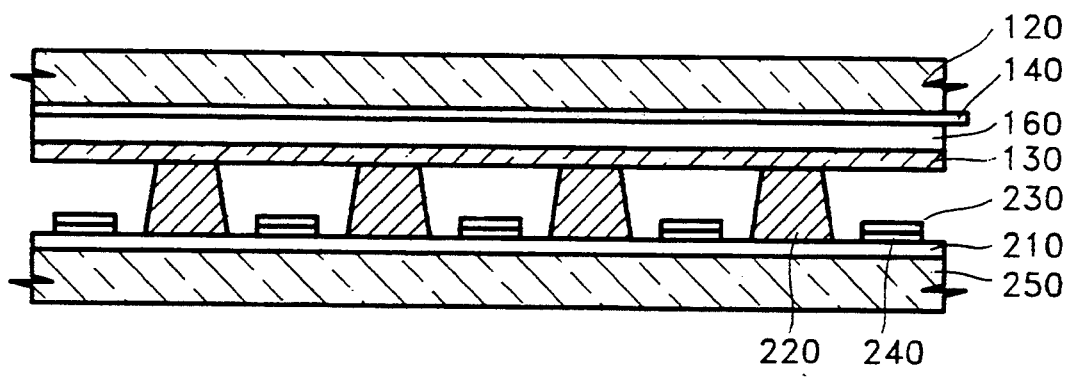
FIG. 4 is a sectional view of the plasma addressed liquid crystal display of the present invention shown in FIG. 3.

Transparent first and third substrates 120 and 250 are positioned at a predetermined distance apart from each other to protect a later-mentioned functional layer placed therebetween. A plurality of striped transparent data electrodes 140 are formed in parallel on first substrate 120. A liquid crystal layer 160 and a second substrate 130 are subsequently provided in contact with the first substrate. As shown in FIG. 4, a plurality of barriers 220 are provided in parallel between second and third substrates 130 and 250 at right angles to data electrodes 140. First electrode 210 is provided over the whole inner surface of third substrate 250. The second electrodes 230 are formed on the top of the first electrode 210 positioned between barriers 220 and separated from the first electrode 210 by insulators 240 sandwiched between the second electrodes 230 and the first electrode 210.

In the above structure of the first embodiment of the present invention, gas discharge occurs between second electrodes 230 placed between barriers 220 and first electrode 210 having its narrow side surface exposed on either side of the second electrodes. Since the exposed portions of the first electrode 210 and second electrodes 230 run in the same direction, line discharge or scan discharge is created.

Figure 5:
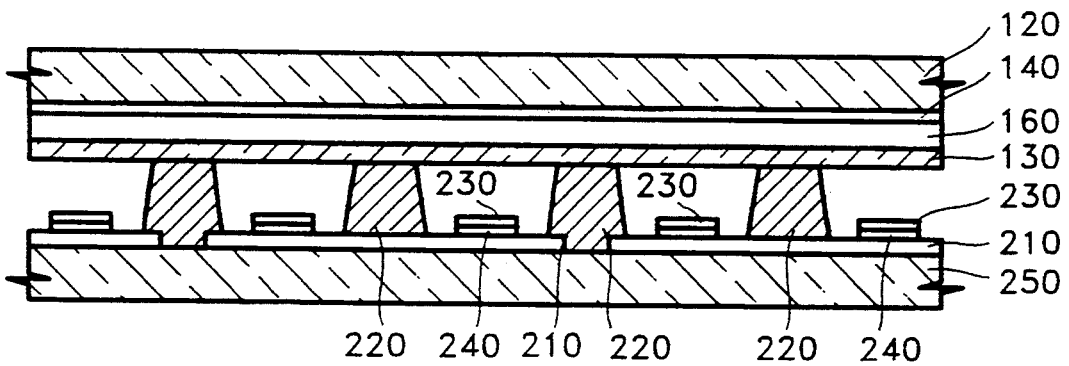
FIG. 5 is a sectional view of another embodiment of the liquid crystal display of the present invention.

Meanwhile, as shown in FIG. 5, first electrode 210 may be divided into a plurality of segments. One segment of first electrode 210 has multiple second electrodes 230 disposed thereon so that voltage applied across one segment of first electrode 210 affects the second electrodes disposed thereon.

In order to enhance the effect due to the structural features of the present invention, it is desirable that liquid crystal layer 160 be formed of polymer dispersed liquid crystal, not of liquefied liquid crystal. The polymer dispersed liquid crystal is more suitable for the liquid crystal display of the present invention which is greatly dependent upon the screen print method since it has a rapid response and is easy to treat.

Preferably, first electrode 210 and second electrodes 230 comprise nickel paste or silver paste such as DuPont product No. 9535 or No. 7713. In addition, barriers 220 and insulators 240 comprise a paste having a melting point of above 500° C. which includes a large quantity of metal oxide components, e.g., $Al_2O_3$ or $SiO_2$. An example of such a paste is DuPont product No. 9541.

The driving method of the LCD of the present invention is similar to the conventional one. A data signal is input to the data electrode of the liquid crystal shutter, and voltage of a predetermined potential, i.e., a scan signal is applied to selected first and second electrodes of the plasma addressing unit. Accordingly, a discharge is created which forms an electrical field with the liquid crystal in the direction of the discharge line. The liquid crystal is activated to be oriented in one direction at its intersection with the data electrode where data is input.

As described above in detail, the structure of the present invention facilitates manufacturing in that the more desirable ordinary silk screen printing method rather than the conventional thin layer material can be used in forming a scan electrode, thereby realizing a large screen.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. A plasma addressed liquid crystal display comprising:

a first substrate having an upper surface and a lower surface;

a plurality of striped data electrodes formed on the lower surface of said first substrate;

a second substrate having an upper surface and a lower surface, said second substrate being disposed proximate to said first substrate such that the upper surface of said second substrate opposes the lower surface of said first substrate;

a liquid crystal layer disposed between said first and second substrates;

a third substrate having an upper surface and a lower surface, said third substrate positioned such that the lower surface of said second substrate opposes the upper surface of said third substrate;

a first electrode having an upper surface and a lower surface, said first electrode being formed over the entire upper surface of said third substrate;

a plurality of barriers of a predetermined height disposed between said second and third substrates at right angles to said data electrodes; and a plurality of striped second electrodes disposed in parallel with said barriers on the upper surface of said first electrode, said plurality of striped second electrodes being electrically insulated from said first electrode.

2. A plasma addressed liquid crystal display as claimed in claim 1, wherein said second electrodes are stacked on said first electrode with a striped insulator sandwiched between said first and second electrodes.

3. A plasma addressed liquid crystal display as claimed in claim 2, wherein said second electrode comprises metal paste.

4. A plasma addressed liquid crystal display as claimed in claim 1, wherein said liquid crystal layer comprises a polymer dispersed liquid crystal .

5. A plasma addressed liquid crystal display as claimed in claim 4, wherein said second electrodes each comprise a transparent material.

6. A plasma addressed liquid crystal display comprising:

a first substrate having an upper surface and a lower surface;

a plurality of striped data electrodes formed on the lower surface of said first substrate;

a second substrate having an upper surface and a lower surface, said second substrate being disposed proximate to said first substrate such that the upper surface of said second substrate opposes the lower surface of said first substrate;

a liquid crystal layer disposed between said first and second substrates;

a third substrate having an upper surface and a lower surface, said third substrate positioned such that the lower surface of said second substrate opposes the upper surface of said third substrate;

a first electrode divided into a plurality of segments, each segment having an upper surface and a lower surface, the segments being disposed on the upper surface of said third substrate and being spaced apart by a predetermined distance;

a plurality of barriers of a predetermined height disposed between said second and third substrates at right angles to said data electrodes; and a plurality of striped second electrodes disposed in parallel with said barriers on the upper surfaces of the segments of said first electrode, said plurality of striped second electrodes being electrically insulated from said first electrode.

7. A plasma addressed liquid crystal display as claimed in claim 6, wherein said second electrodes are stacked on said first electrode with a striped insulator sandwiched between said first and second electrodes.

8. A plasma addressed liquid crystal display as claimed in claim 7, wherein said second electrode comprises metal paste.

9. A plasma addressed liquid crystal display as claimed in claim 6, wherein said liquid crystal layer comprises a polymer dispersed liquid crystal.

10. A plasma addressed liquid crystal display as claimed in claim 9, wherein said second electrodes each comprise a transparent material.

* * * * *